July 10, 1956

B. W. SEWELL ET AL 2,754,085

PORTABLE SHOT HOLE DRILL

Filed Feb. 28, 1952

Ben W. Sewell
John M. Camp  Inventors

By W. O. J Heilman Attorney

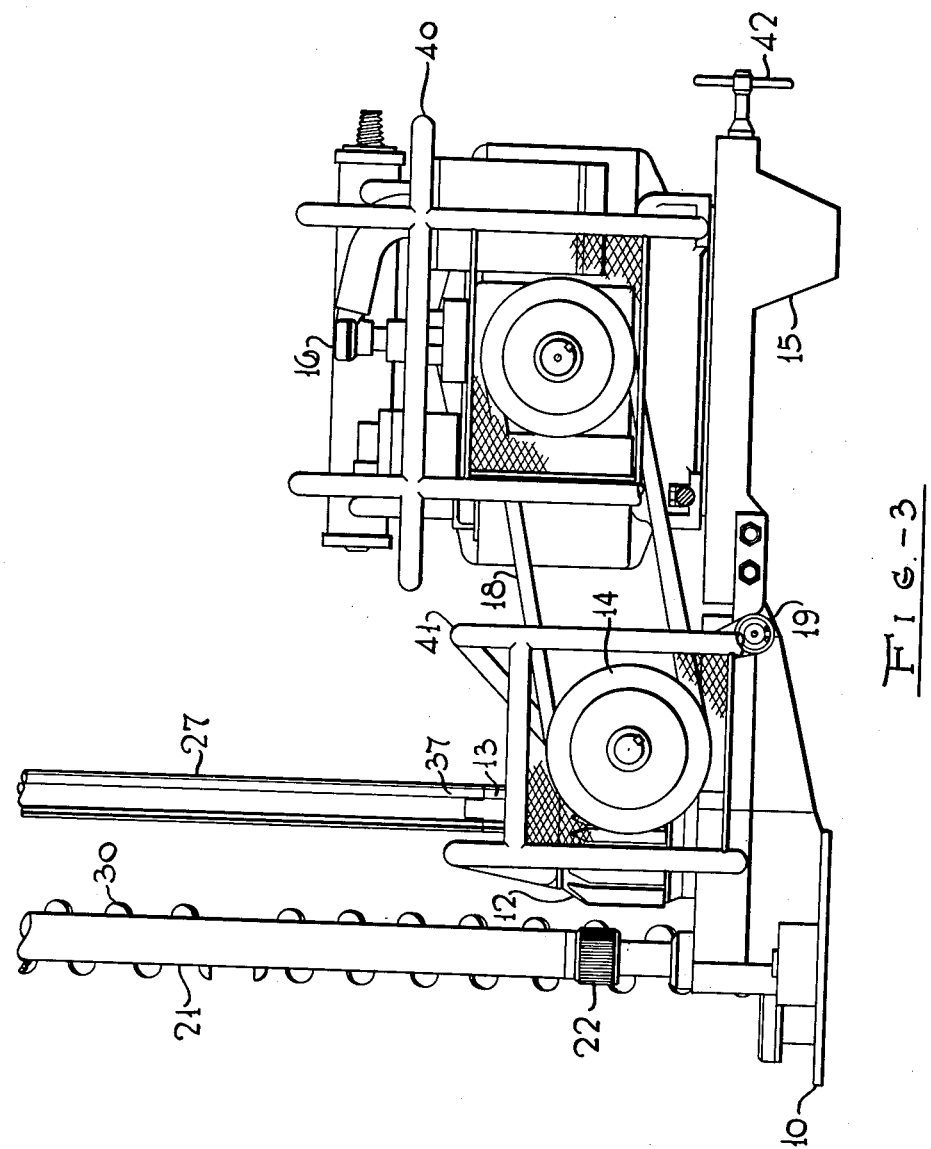

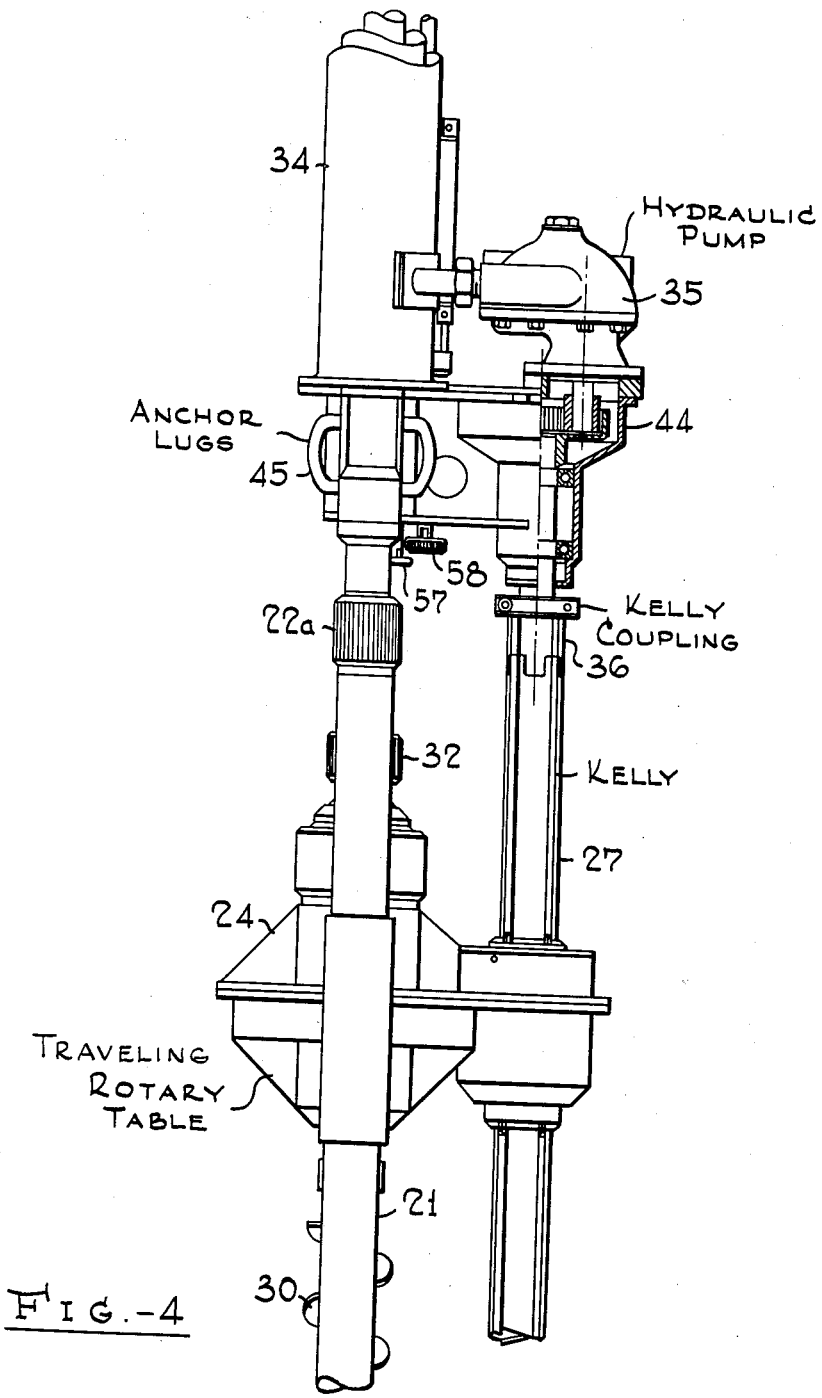

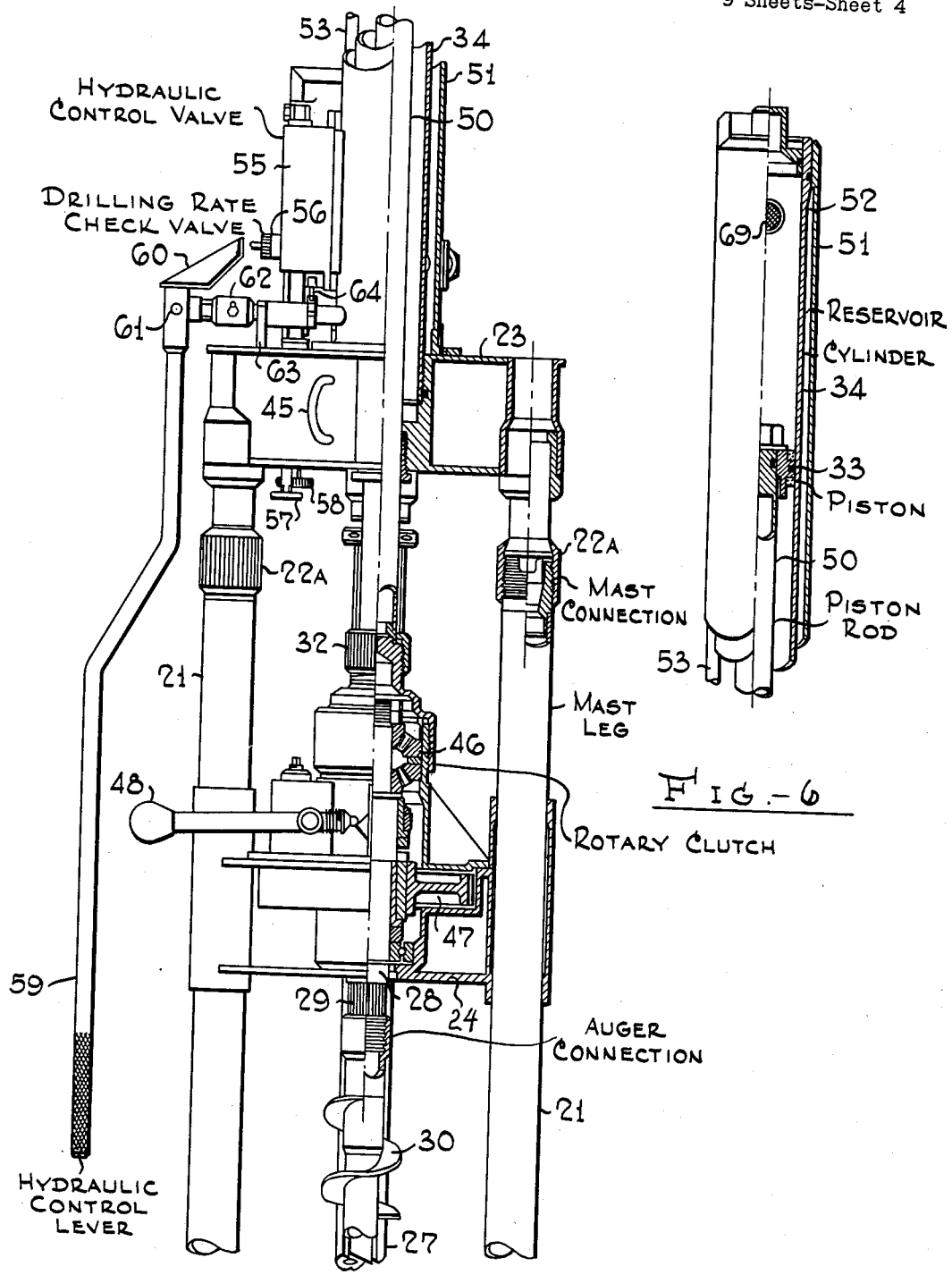

July 10, 1956

B. W. SEWELL ET AL 2,754,085

PORTABLE SHOT HOLE DRILL

Filed Feb. 28, 1952

Ben W. Sewell
John M. Camp    Inventors

By W. O. Teilman  Attorney

July 10, 1956

B. W. SEWELL ET AL 2,754,085

PORTABLE SHOT HOLE DRILL

Filed Feb. 28, 1952

Ben W. Sewell
John M. Camp   Inventors

By W. O. T Heilman  attorney

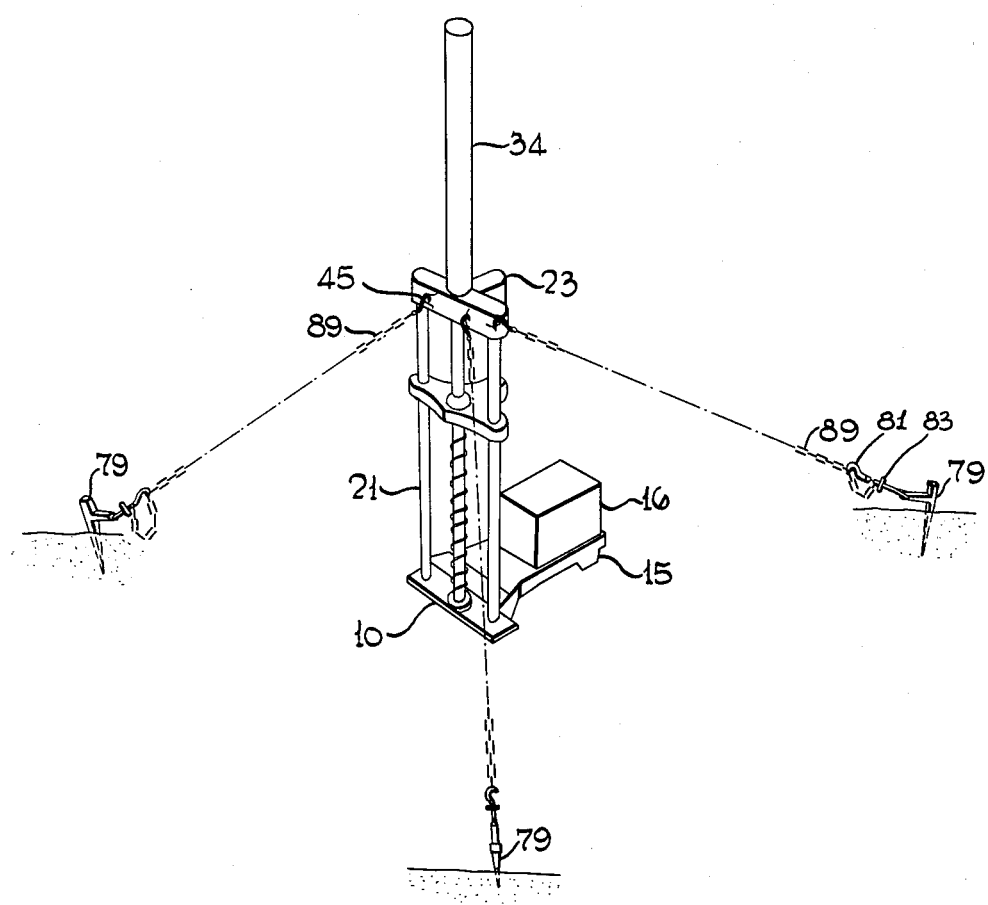

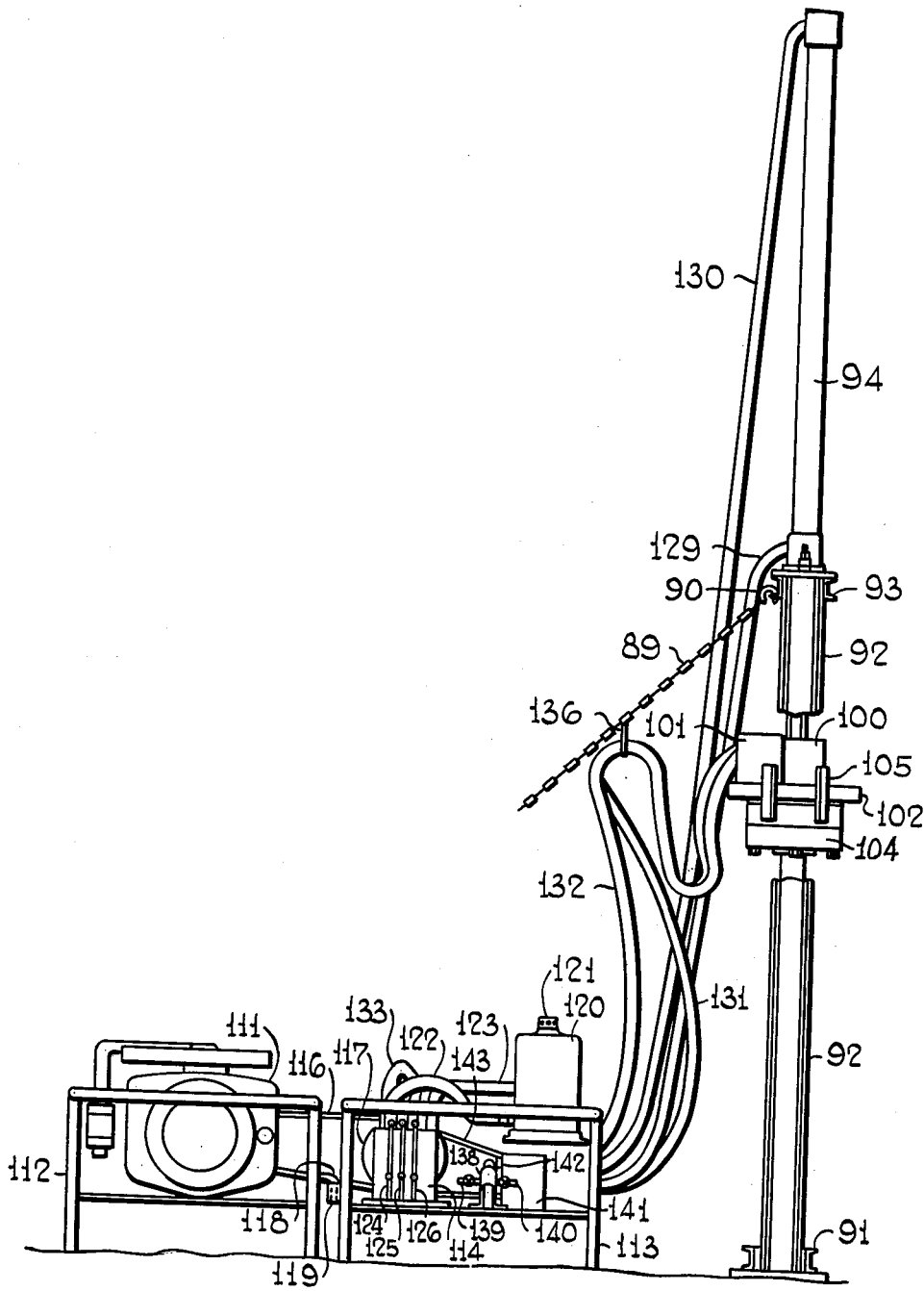

July 10, 1956

B. W. SEWELL ET AL 2,754,085

PORTABLE SHOT HOLE DRILL

Filed Feb. 28, 1952

Ben W. Sewell
John M. Camp  Inventors

By W. O. T. Heilman  Attorney

United States Patent Office 2,754,085
Patented July 10, 1956

2,754,085

PORTABLE SHOT HOLE DRILL

Ben W. Sewell and John M. Camp, Tulsa, Okla., assignors to Esso Research and Engineering Company, a corporation of Delaware Application February 28, 1952, Serial No. 273,958

7 Claims. (Cl. 255—22)

The present invention relates to a portable drill for boring shot holes in the earth for use in seismograph survey operations. More particularly, the invention concerns a shot hole drill of rugged design that is adapted for ready assembling and dismantling, using component parts that can be easily transported by manpower.

This application is a continuation-in-part of application Serial No. 179,655, filed August 16, 1950, now abandoned.

Among the various methods employed in prospecting for oil or other mineral deposits is that known as the seismic method wherein an explosive charge is detonated in a shot hole and the motion of the earth from the resulting seismic disturbance is detected at a number of points spread out in a desired pattern from the shot hole, sensitive pickups or geophones being employed to translate the detected motion into electrical impulses, which after suitable amplification are recorded on a seismograph. The shot holes are normally drilled through the weathered layer on the surface of the earth to enable the shot to be placed below this layer in order that the maximum amount of energy may be directed downward to underlying reflecting layers. It is necessary in many cases to negotiate all types of terrain in order to conduct the desired seismic prospecting operations. Consequently portable equipment for the more difficult areas is desirable and numerous portable drills for the purpose have been developed. However, most of the portable drills are light in weight and thus cannot exert sufficient weight on the drill bit to obtain good drilling rates in the harder formations that are often encountered. Also when the portable drills are of the conventional rotary type the need for water as a drilling fluid often becomes a major problem since this water must sometimes be transported a considerable distance. Hence there has been need for a portable shot hole drill that overcomes the limitations of the drills thus far developed.

One object of the present invention is to provide a portable shot hole drill that is designed primarily for drilling with auger bits to decrease or eliminate the need for water in areas where transportation is a serious problem. At the same time it is a further object to provide such a drill that is adapted for ready conversion to rotary type drilling when necessary or desirable. Another object is to provide a portable drill of rugged construction that can be disassembled into a minimum number of units for ready transportation by manpower. Still another object is to provide a portable shot hole drill which will enable sufficient pressure to be applied to the drill bit to drill all the formations encountered without increasing the overall weight of the drill.

In accordance with the present invention there is provided a portable earth boring drill assembly which is readily taken apart into separate units. One of these units comprises a power source which may conveniently be a portable gasoline engine mounted on a suitable base. Another unit comprises a drill base having means for supporting a detachable hydraulic unit for raising and lowering a string of drill sections. Still another separable unit consists of a rotary table for rotating the drill sections, the rotary table and the drill sections being detachably supported by the movable portion of the hydraulic unit. An additional unit comprises means for transferring power from the power source to the rotary table and from the power source to the hydraulic unit. Other essential units include means for anchoring the assembled drill to the ground so that the drill may be held in its upright position and also to hold down the drill when pressure is exerted on the drill stem by the hydraulic unit. The anchoring means comprises a plurality of tension lines each of which is fastened at one end to a portion of the drill assembly and at its other end to a ground fastener that is adapted to overcome withdrawal from the ground by tension in the line so that the anchoring means will act to oppose upward forces exerted against the assembly during drilling. Thus greater "weight" may be placed on the drill bit than is available from the mass of the drilling assembly itself. Several embodiments of the invention are possible within the confines of the invention and at least two embodiments will be described in detail in the present specification.

One embodiment of the invention comprises a drill base carrying a gear case having a drive shaft to which a kelly can be connected, a portable engine detachably connected to the drill base and drive means connectable to the gear case, upright mast members detachably connected to the drill base, a Kelly member that attaches vertically to the drive shaft on the gear case, a rotary table provided with guide openings and with a Kelly drive opening enabling the rotary table to be slidably fitted on the upright mast members and on the Kelly member, and a hydraulic unit attachable to the upright mast members and having a hydraulic pump whose drive shaft couples to the top of the kelly. The kelly on this drill has no vertical motion but instead the rotary table slides up and down on the kelly. The hydraulic unit raises and lowers the rotary table as well as the string of auger members that are suspended from the rotary table. This hydraulic unit is of novel design and is particularly adapted for controlling the drilling rate and the "weight" on the drill as explained later in the specification.

In another embodiment of the invention the gear case and kelly are dispensed with, making it possible to have the drill base and the upright mast members as an integral unit which will not be too heavy for carrying. In this embodiment the rotary table is hydraulically driven and there is provided a unit comprising a hydraulic pump, a hydraulic reservoir and a number of valves, the unit being mounted on a suitable base so that it may be placed adjacent the portable power source and detachably connected thereto. Flexible conduit lines conduit hydraulic fluid from the hydraulic pump to the rotary table and back to the pump and similar lines conduct fluid to and from the hydraulic unit for raising and lowering the drill sections.

The nature and objects of the invention and the manner in which it may be utilized will be readily understood from the ensuing description when taken in conjunction with the accompanying drawings in which:

Figure 3 is a side elevational view of the lower portion of an assembled drill as represented by one specific embodiment of the invention;

Figure 4 is an upper continuation of Figure 3;

Figure 5 is a front elevational view corresponding to Figure 4;

Figure 6 is an upper continuation of Figure 5;

Figure 10 is a schematic diagram showing a method of anchoring the drill;

Figure 11 is a side elevational view of a second specific embodiment of the invention utilizing a hydraulic drive for the rotary table;

Figures 1, 2:
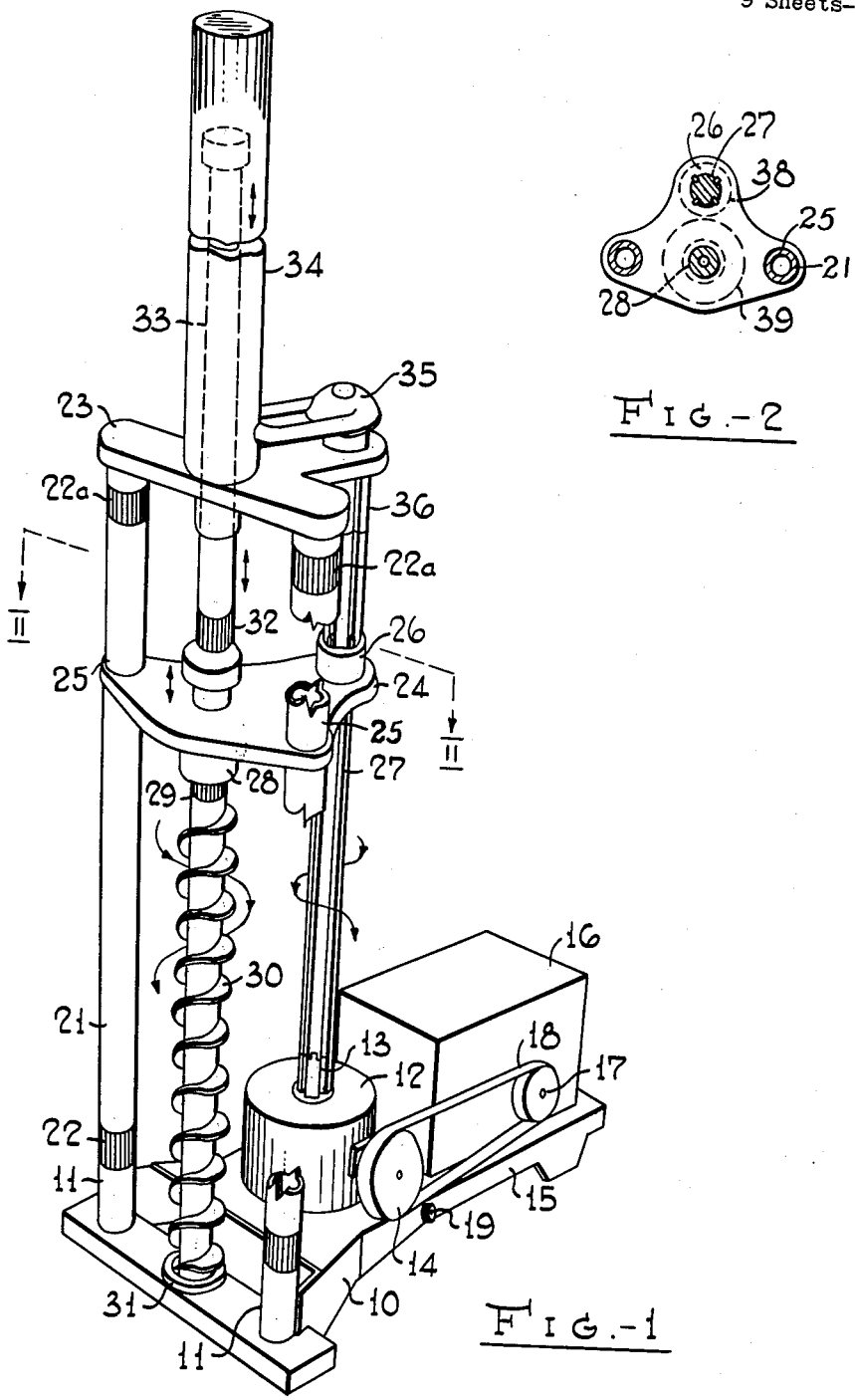
Figure 1 is a schematic perspective view of an assembled drill incorporating one embodiment of the invention, showing its principal separable units and the points at which they are coupled together.
Figure 2 is a sectional plan view along line II—II of Figure 1 and shows schematically the gear arrangement within the rotary table of Figure 1.

With particular reference to Figure 1, which shows schematically one embodiment of the invention, one of the separable units of the drill comprises a drill base 10 which is provided with mast supports 11 and a gear case 12 having an upright drive shaft 13 and a drive wheel 14. Detachably connected to the drill base 10 is an engine unit comprising an engine base 15 supporting a small gasoline engine 16 and a drive wheel 17 which is coupled to the drive wheel 14 through an endless belt 18, preferably a V-belt. Drill base 10 and engine base 15 are held together by at least one connector 19. Detachably supported by base 10 are upright masts 21 and mast couplers 22 that threadedly engage threads on mast supports 11. Similar mast couplers 22a connect the upper ends of masts 21 to supporting frame 23 of the hydraulic unit. Kelly 27 has irregularly shaped ends one of which fits into a mating irregular shape on the end of gear case shaft 13 and the other end of which engages a mating irregularity on the bottom of pump shaft 36. Thus the hydraulic unit is supported by the two masts 21 and by the kelly 27.

Another separable unit of the drill comprises rotary table 24 which is provided with mast openings 25 that enable the rotary table to slide on the upright masts 21. The driven shaft 26 of the rotary table is hollow and is keyed to match keyways on the kelly 27. As shown in Fig. 2 the rotary table is provided with a driven gear 38 which is rotated by the kelly through shaft 26 and a driving gear 39 which is adapted to rotate the driving shaft 28 of the rotary table. The upper side of the rotary table has a piston coupling 32 which does not rotate but which couples with piston 33 of the hydraulic unit. Supported from the driving shaft 28 of the rotary table are a plurality of auger bit sections 30, the top one of which is threadedly attached to the driving shaft through an auger coupling 29. (A slip spider 31 in the drill base aids in guiding the auger.) Hydraulic pump 35, which is driven by kelly 27, furnishes hydraulic power for raising and lowering piston 33 within cylinder 34.

One specific embodiment of the invention is shown in Figures 3, 4, 5 and 6, Figure 3 being a side elevational view of the lower portion of an assembled drill, Figure 4 being an upper continuation of Figure 3 with a portion of the hydraulic pump gear drive shown in section, Figure 5 being a front elevational view, partly in section, corresponding to Figure 4, and Figure 6 being an upper continuation of Figure 5, showing additional details of the hydraulic unit. In these figures the various reference numerals have the same significance as in Figure 1.

The manner of connecting the engine base 15 to the drill base 10 by means of connection 19 is clearly shown in Figure 3. It is desirable that guards 40 and 41 be used in order to protect the operator from accidental contact with the drive wheels and belt when the engine is in operation. Proper tension in the driving belt 18 can be attained by providing for limited slidable movement of engine 16 on base 15, using a threaded takeup bolt 42 to slide the engine along the base.

As shown in Figure 4 the kelly 27 not only drives the rotary table 24 but also drives the hydraulic pump 35 through a gear case 44. Anchor lugs 45 are provided in the supporting frame of the hydraulic unit to anchor the drilling unit as will be more fully explained in connection with Figure 10. With reference to Figure 5 it will be noted that rotary table 24 is supported from piston rod 50 of the hydraulic unit through threaded coupling 32. A bearing 46 is provided so that the driving shaft of the rotary table can rotate without causing rotation of the piston rod. The rotary table is provided with a clutch 47 actuated by clutch lever 48 to transfer motion from the kelly 27 to the driving shaft 28 of the rotary table.

It will be seen from Figure 6 that the hydraulic unit has an outer jacket 51 surrounding the cylinder 34, thus providing between the outer jacket and the cylinder an annular reservoir 52. An oil return line 53 is set within the annular reservoir. The function of the reservoir and return line will be more clearly understood from the flow diagram of Figure 8, discussed below. A breather 69 is set in the wall of the outer jacket 51 and communicates with reservoir 52 to equalize air pressure inside and outside the reservoir with volume changes of fluid in the reservoir. During operation of the drill the hydraulic pump 35 operates continuously and the upward and downward travel of piston 33 is controlled with the control lever 59. This control lever is pivotally attached at point 61 to a spindle 62 which is rotatably held by a bracket 63 fixed to the support 23 of the hydraulic unit. Thus lever 59 can be moved outwardly from the drill assembly on pivot 61 and can operate by moving to the right or left of the assembly on spindle 62. When the lower portion of lever 59 is moved outwardly away from the drill, arm 60 will press drilling rate check valve 56. When lever 59 is moved to the left or right on spindle 62 a linkage 64 will actuate hydraulic control valve 55. The various positions of the control lever 59 are shown schematically in Figure 7, the positions being labelled $n$, $r$, $l$ and $f$, referring respectively to neutral, right, left and forward positions of the lever. A pair of control wheels 57 and 58 project from the bottom of the hydraulic unit and are adapted to control the adjustment of drilling rate and drilling weight respectively as will be more fully explained below.

Figure 7:
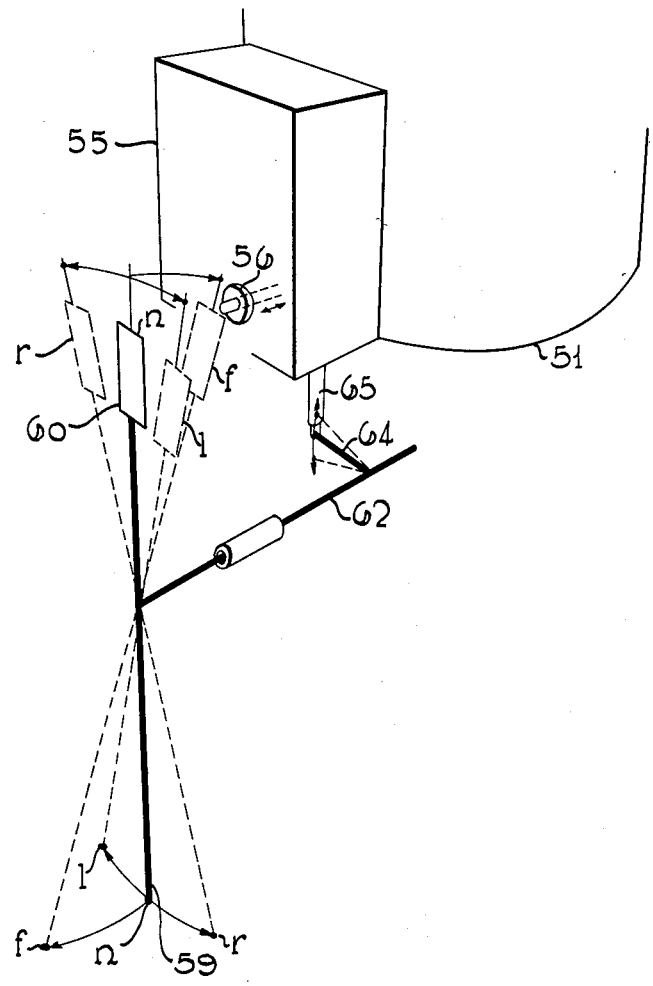
Figure 7 is a schematic motion diagram showing the operation of the hydraulic control lever.
Figure 8:
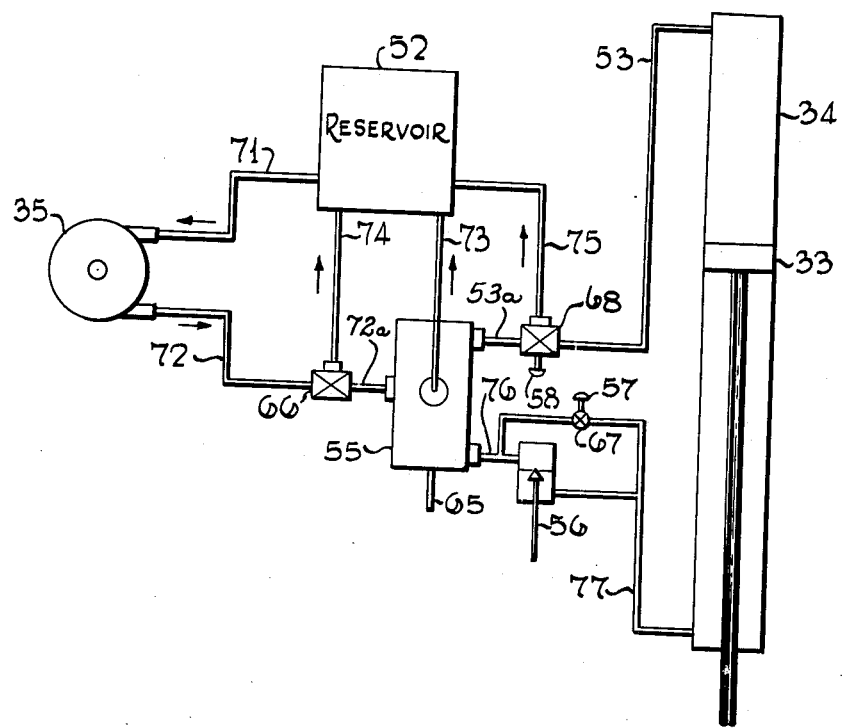
Figure 8 is a schematic flow diagram of the hydraulic system.

The manner in which the hydraulic system operates is shown schematically in Figure 8. When hydraulic control lever 59 is in the neutral position as shown in Figure 7 and hydraulic pump 35 is operating, the hydraulic fluid circulates from reservoir 52 through conduit 71 into the pump, then out of the pump through conduit 72 into four-way control valve 55 and back to the reservoir through conduit 73. A pressure relief valve 66 is inserted in line 72 to by-pass fluid directly into the reservoir through line 74 in the event that pressure build-up in valve 55 becomes too great for safety. One of the outlet ports of four-way valve 55 is connected to a parallel conduit arrangement 76 in one side of which is placed an adjustable needle valve 67, referred to as a drilling rate adjustment valve, and in the other side of which is placed a flow check valve 56, referred to as a drilling rate check valve. The parallel conduit then merges into a single conduit 77 leading into the lower part of cylinder 34. Flow check valve 56 is so designed that when it is open, free flow of fluid is permitted in either direction, but when it is closed, flow of fluid from the outlet side, which is connected to conduit 77, to the inlet side, connected to valve 55, is stopped, whereas flow of fluid in the opposite direction is not stopped but the latter flow will operate to open the valve.

Four-way valve 55 is so designed that it may be set in any one of three positions. For convenience, these three positions may be related to the left, right and neutral positions of lever 59 as shown in Figure 7. In the neutral position, the inlet port of the valve, i. e. the port connected to conduit 72, communicates with the outlet port that is connected to conduit 73. In the right hand position, valve 55 establishes communication between conduit 72a and conduit 76 as well as communication between conduit 53a and conduit 73. In the left hand position, fluid communication is established by the valve between conduit 72a and conduit 53a and between conduit 73 and conduit 76.

When it is desired to raise piston 33, control lever 59 is thrown to the right, which pulls plunger 65 downwardly so that the fluid is directed through conduit 76, valve 56, and line 77 to the bottom of cylinder 34. As already explained, if valve 56 is initially closed at this time, flow in this direction readily opens it. Fluid above the piston 33 flows back into the reservoir through line 53, valve 55 and line 73. When it is desired to lower piston 33 rapidly, control lever 59 is thrown to the left as shown in Figure 7. This actuates valve 55 so that fluid flows through line 53 into the top of cylinder 34 and fluid below piston 33 flows back into the reservoir 52 through line 77 and valve 56. In the event that valve 56 is closed at this time it may be readily opened by momentarily moving lever 59 to the right, which will cause fluid flow in the proper direction to open the valve as described above.

If it is desired to lower piston 33 slowly, as when drilling, for example, lever 59 is thrown to the left as just described and in addition is pulled outwardly so that valve 56 closes. The fluid can then flow only through drilling rate adjustment valve 67. It will be seen that operation of valve 56 by pulling outwardly on lever 59 is required only when the lever is also in the left or piston lowering position. However, in order to prevent interference with the movement of lever 59 to the right or left if it should happen to be pulled outwardly at the same time, it is preferred that the striking face of arm 60 of the control lever be broad enough to engage the plunger of valve 56 regardless of the rotational position of lever 59. One purpose served by drilling rate adjustment valve 67 is to control any downward pull that may be exerted on piston 33, since when auger drills are employed they often grip the ground with sufficient force to tend to pull the drill downwardly. As explained previously, valve 67 is an adjustable orifice valve, adjustment being made by means of wheel 57. Drilling weight adjustment valve 68 is merely an adjustable pressure relief valve which controls the hydraulic pressure being exerted on piston 33 during its downward travel, adjustment being made with control wheel 58.

Figure 9:
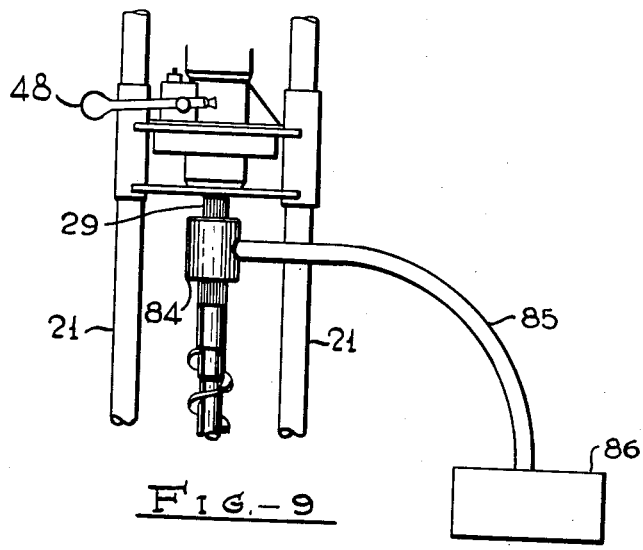
Figure 9 shows a modification providing for wet auger drilling or for rotary drilling.

The embodiment described in connection with Figures 3, 4, 5 and 6 is adapted for dry auger drilling. In some instances drilling rates can be increased by injecting small amounts of water as a lubricant. A convenient means for thus injecting the water is shown in Figure 9. A swivel 84 is attached to auger coupling 29 on the bottom of the rotary table and hollow augers are connected below the swivel as shown. A hose 85 connected to a pump 86 carries water into the bore of the auger sections through the swivel. To convert the drill for use in rotary drilling it is a simple matter to substitute the usual shot hole drill pipe for the auger sections shown and to circulate drilling mud down through the pipe by means of the swivel arrangement shown in Figure 9.

The manner of holding the assembled drill in an upright position is shown in Figure 10. Preferably the drill is anchored at four points by means of ground anchors 79 and chains 89 which attach to anchor lugs 45. Major adjustment in the length of the chain can be made by means of a slack-take-up hook 81 and minor adjustments by means of tension screw 83. It will be noted from Figure 10 that the line of force projected from each of the chains 89 intersects the anchor stake at such an angle that there is practically no tendency for the stake to be pulled from the ground by tension in the chain, thus enabling the ground stakes and chains to oppose the upward forces that are exerted against the drill assembly during drilling. Stated inversely, the combination of ground stakes and chains enables greater weight to be placed on the bit than would be available merely from the mass of the drill assembly.

Figure 12:
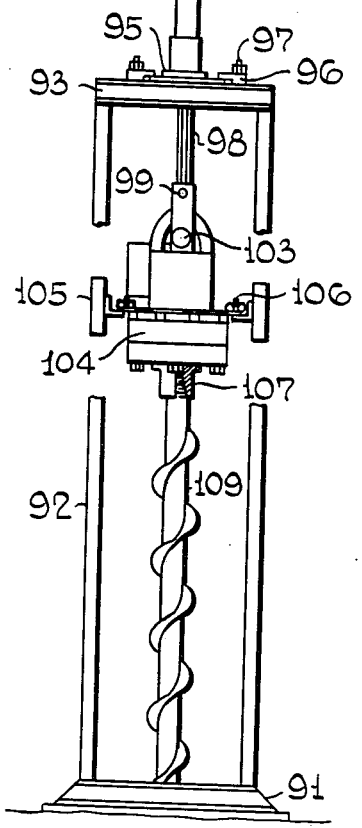
Figure 12 is a front elevational view corresponding to a portion of Figure 11.

A second and in many respects a preferred embodiment of the invention is shown in Figures 11 and 12, Figure 11 being a side elevational view of the assembled drill and associated units and Figure 12 being a front elevation of the right hand portion of Figure 11. This drill is provided with a base 91 to which are attached upright members 92 supporting a crossbar 93. Conveniently, base 91, uprights 92 and crossbar 93 may be made of channel iron and the parts welded together into a single frame that will not be too heavy for carrying. An elongated hydraulic cylinder 94 mounted on a base 95 is supported by crossbar 93 and is held in place with lugs 96 and bolts 97. Cylinder 94 contains a piston having a rod 98 extending downwardly therefrom through a suitable opening in base 95. A swivel 100 is detachably held by piston rod 98 by means of a pin or bolt 99. A platform 102 is attached to swivel 100 and supports a fluid motor 101 and a gear box 104, the motor and gear box being mechanically connected. Rotary table guides 105 are detachably held by platform 102 by means of wing nuts 106. It will be seen that guides 105 are positioned on either side of each of the upright members 92 so that the rotary table member comprising the swivel motor and gear box will be properly guided by the uprights 92 during drilling. A hollow stem auger 109 is threadedly connected to swivel wash pipe 107. Thus water can be sent down through the hollow augers to aid in drilling in the same manner as described in connection with Figure 9, the water entering the swivel through opening 103, the flexible hose for this purpose being omitted from the drawing in the interest of clarity.

Power for the drill is supplied by a small gasoline engine 111 mounted on a suitable base 112. A similar base 113 supports a hydraulic pump 114 and the two bases may be placed on the ground adjacent each other and held in fixed relation by means of at least one connector 118 fitting into a socket 119, the socket being placed on one of the bases and the connector on the other base. Power is transmitted from the engine to the pump by means of a belt 116 that runs from a pulley of the engine (not shown) to the pulley 117 of the pump. Base 113 also supports a hydraulic reservoir 120 provided with a breather and filler cap 121 serving the same function as the breather 69 of Fig. 6. Fluid lines 122 and 123 connect the reservoir with the hydraulic pump and with the multiple valve unit having at least three valves 124, 125 and 126. Flexible fluid lines 129 and 130 conduct fluid from the valve unit to the upper and lower ends of hydraulic cylinder 94 and flexible fluid lines 131 and 132 similarly conduct fluid to the fluid motor 101.

Figure 13:
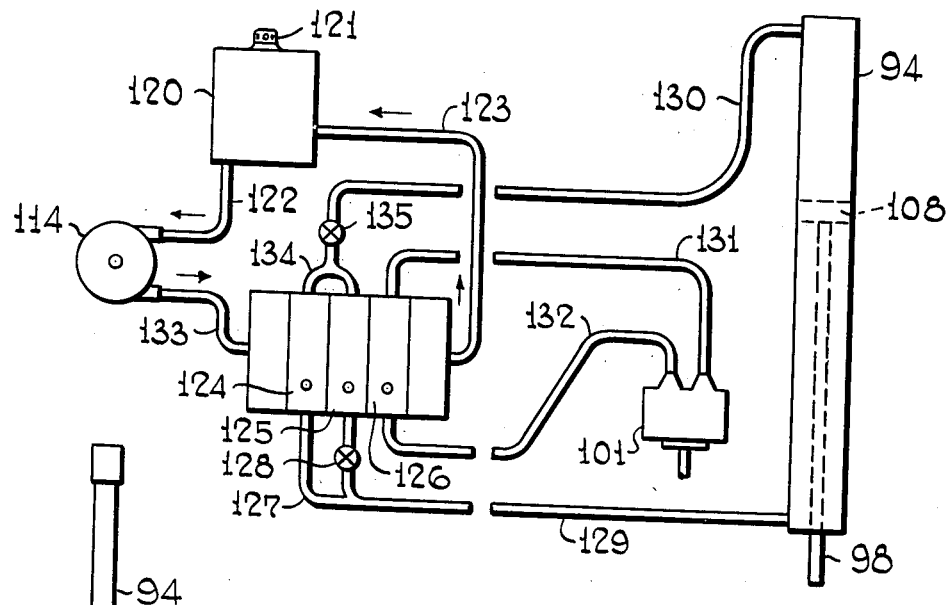
Figure 13 is a schematic flow diagram of the hydraulic system for the embodiment depicted in Figures 11 and 12.

The arrangement of fluid lines and valves will be more clearly understood from the ensuing description when considered in connection with Figure 13, which is a schematic diagram of the hydraulic system. Fluid from reservoir 120 enters pump 114 through fluid line 122 and is then pumped through line 133 to the multiple valve unit comprising valves 124, 125 and 126. Each of these valves is a 4-way control valve similar to 4-way valve 55 of Figure 8 and has three operating positions in which it may be set by means of the valve handles shown in Figure 11. Each of these handles is pivoted at its lower end and it attached to a valve plunger intermediate its ends so that it may be grasped by the knob at the top and moved in toward the valve unit or outwardly away from the valve unit. Thus the three positions may be designated as inward, upright, or outward. In Figure 13 the valve handles have been omitted in the interest of clarity and only the valve plungers are shown, appearing as small circles in the sides of the valve units. With all of the valve handles in the upright position, fluid entering the valve unit will be by-passed back into the reservoir through line 123. With the handle of valve 126 in the inward position fluid will circulate through flexible lines 131 and 132 to rotate fluid motor in one direction, say clockwise, and with the valve handle in the out position circulation through the fluid lines will be in the reverse direction and will correspondingly rotate fluid motor 101 in the opposite direction. When the handle of valve 124 is pushed forward fluid will flow out through Y-connection 134 and pressure regulating and check valve 135 through flexible line 130 to the top of cylinder 94, thus forcing piston 108 downwardly.

Fluid below piston 108 will flow through line 129 and conduit 127 into valve 124 and from thence from line 123 to reservoir 120. By pulling the handle of valve 124 out, fluid will flow in the opposite direction through lines 129 and 130 and will raise piston 108. Inward and outward motion of the handle of valve 125 will similarly lower and raise piston 108 but the travel rate would be much too slow because of the restriction imposed by valve 128, which is an adjustable needle valve. Thus valve 124 may be used for raising and lowering piston 108 rapidly and valve 125 may be used for raising and lowering the piston slowly. It will thus be seen that complete control of the drill can be obtained with these three valves.

Referring again to Figure 11, when it is desired to inject small quantities of water into the center of the auger sections 109 to aid in drilling, the water may be supplied at a selected rate by means of a pump 138, which may be a single-acting reciprocating pump operated by an eccentric drive 142 attached to a gear case 141, which is driven by a belt 143 from the pulley 117 of the hydraulic pump. The water enters pump 138 through inlet 139 and leaves through outlet 140 and is then carried to the inlet 103 of the swivel by means of an additional flexible line not shown.

It will thus be seen that the drill depicted in Figures 11 and 12 is likewise adapted for dismantling into a number of small units for ready transportation by manpower and that this embodiment is in many respects more flexible in operation than the embodiment of Figures 3, 4, 5 and 6. The drill is held in an upright position by means of a chain 89 in the same manner as the first embodiment of the invention. The hook 90 on the end of the chain engages in suitable openings in the crossbar 93. A strap 136 may be attached to one of the chains 89 to support the fluid lines 131 and 132 in the manner shown in order to minimize interference with the vertical travel of the rotary table.

It is intended that this invention be limited only by the appended claims and not by the specific embodiments described in the foregoing specification.

What is claimed is:
1. An improved earth boring drill assembly comprising: a first unit including a drill base and driving means supported by said base; a second unit comprising a power source detachably connected to said base and means supplying power from said power source to said driving means; a third unit comprising a hydraulic system including a vertically travelling piston, a source of hydraulic pressure and means transmitting hydraulic pressure from said last named source against said piston in a selected direction and at a selected rate, supporting means detachably supporting said hydraulic system on said drill base, means transmitting power from said driving means to said hydraulic pressure source, at least one drill section detachably suspended from said piston, power transmitting means detachably connected to said driving means to rotate said drill section and means anchoring the drill base to the ground at a selected location to be drilled, said anchoring means comprising a plurality of tension lines and ground fasteners, each of said lines being fastened at one end to a portion of said assembly and at its other end to one of said ground fasteners, each of said fasteners being adapted to overcome withdrawal from the ground by tension in said line, whereby said anchoring means acts to oppose upward forces exerted against said assembly during drilling.

2. An improved portable earth boring drill assembly comprising: a first unit consisting of a drill base, a gear case supported by said base and a vertical drive shaft driven by said gear case; a second unit comprising an engine base detachably connected to said drill base, an engine supported by said base, and drive means detachably connecting said engine to said gear case; a third unit comprising a supporting frame, a hydraulic cylinder supported by said frame, a piston and piston rod assembly slidably fitted for vertical movement within said cylinder, a hydraulic pump supported by said frame and having a downwardly extending drive shaft, a hydraulic fluid reservoir, and conduits and control valves associated with said hydraulic system for controlling the direction and rate of flow of fluid; fourth and fifth units comprising masts detachably connected vertically to said drill base and to the supporting frame of said hydraulic unit; a sixth unit comprising a kelly detachably connected at one end to said gear case drive shaft and at its other end to the drive shaft of said hydraulic pump; a seventh unit comprising a rotary table provided with a supporting connection detachably fastened to the lower end of said piston and with guide openings and a Kelly drive opening adapting said rotary table unit to move slidably on said mast members and on said kelly upon vertical movement of said piston, a plurality of drill sections detachably connected to the drive shaft of said rotary table, and means anchoring the drill base to the ground at a selected location to be drilled, said anchoring means comprising a plurality of tension lines and ground fasteners, each of said lines being fastened at one end to a portion of said assembly and at its other end to one of said ground fasteners, each of said fasteners being adapted to overcome withdrawal from the ground by tension in said line, whereby said anchoring means acts to oppose upward forces exerted against said assembly during drilling.

3. Assembly according to claim 2 in which said drill sections have a central bore and in which said assembly includes a swivel detachably connecting said uppermost drill sections to said rotary table drive shaft, fluid conduit means communicating with said central bore of said drill sections through said swivel, and means for forcing fluid into said drill sections through said fluid conduit means.

4. In a portable earth boring drill assembly comprising detachably connected units including a base, upright support members detachably held by said base, drill section drive means fitting slidably on said upright support members for vertical movement thereon, and a plurality of drill sections detachably held by said drive means: a hydraulic system for effecting said vertical movement of said drive means comprising a supporting frame detachably held by said upright support members, a cylinder held vertically by said support member, a piston slidably fitted within said cylinder, extending downwardly therefrom said terminating in a connector detachably holding said drill section drive means, a reservoir for hydraulic fluid, a hydraulic pump, a four-way valve having an inlet and three outlets and three operating positions, means actuating said valve to place it in a selected operating position, conduit means connecting the inlet of said pump to said reservoir, conduit means connecting the outlet of said pump to said inlet of said four-way valve, conduit means connecting a first outlet of said valve to said reservoir, conduit means connecting a second outlet of said valve to said cylinder on the lower side of said piston, conduit means connecting the third outlet of said valve to said cylinder on the upper side of said piston, said valve connecting, in one of said operating positions, said inlet with said first outlet, connecting in a second operating position said inlet with said second outlet and said first outlet with said third outlet, and connecting in said third operating position said inlet with said third outlet and said first outlet with said second outlet.

5. System according to claim 4 in which a second cylinder surrounds said first cylinder and defines therewith an annular space comprising said reservoir.

6. System according to claim 4 in which at least a portion of said last named conduit means connecting said third outlet to said cylinder comprises two conduits in parallel, an adjustable orifice valve placed in one of said conduits and a flow check valve placed in the remaining parallel conduit, said flow check valve having an inlet port and an outlet port, said outlet port communicating with the cylinder side of said conduit, said valve being movable to an open position and to a closed position, preventing flow from said outlet port to said inlet port when in said closed position but permitting flow from said inlet port to said outlet port, the latter flow operating to move said from said closed position to said open position, and means for moving said valve to said closed position.

7. System according to claim 6 including a spindle rotatably held by said supporting frame, an elongated lever pivotally held by said spindle for pivotal movement on an axis normal to the rotational axis of said spindle, a linkage transferring rotational motion of said spindle to actuate said four-way valve and a projection on said lever engaging said flow check valve moving means upon said pivotal movement of said lever in a selected direction.

References Cited in the file of this patent

UNITED STATES PATENTS

| | | |
|---|---|---|
| 1,376,045 | Skott et al. | Apr. 26, 1921 |
| 2,114,305 | Johansen | Apr. 19, 1938 |
| 2,317,306 | Smith | Apr. 20, 1943 |
| 2,344,681 | Deschner | Mar. 21, 1944 |
| 2,516,182 | Bury | July 25, 1950 |